Sept. 29, 1942.   L. C. FREEMAN   2,297,298
VEHICLE BODY
Filed Jan. 12, 1940   2 Sheets-Sheet 1
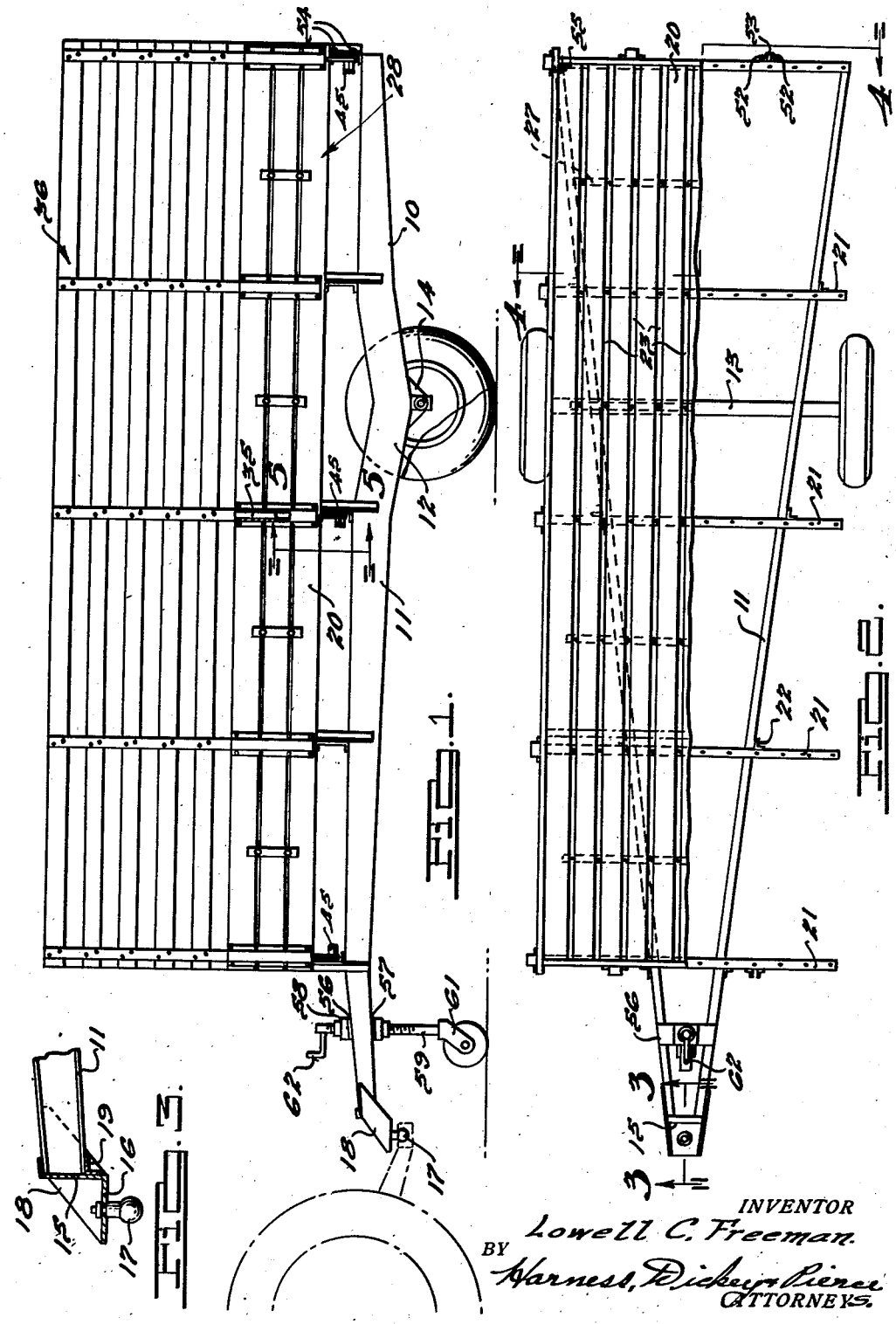
INVENTOR
Lowell C. Freeman.
BY Harness, Dickey & Pierce
ATTORNEYS Sept. 29, 1942.　　　L. C. FREEMAN　　　2,297,298
VEHICLE BODY
Filed Jan. 12, 1940　　　2 Sheets-Sheet 2
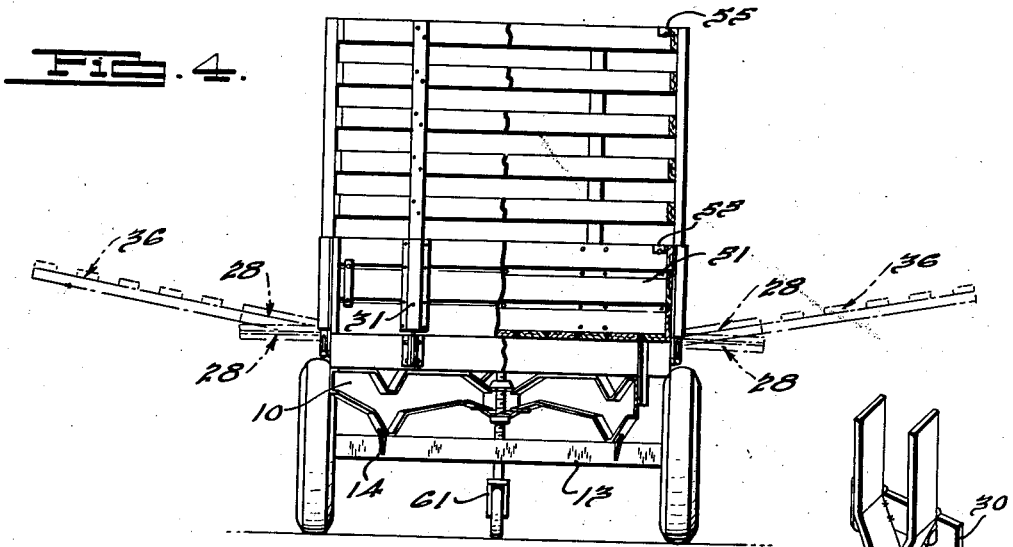
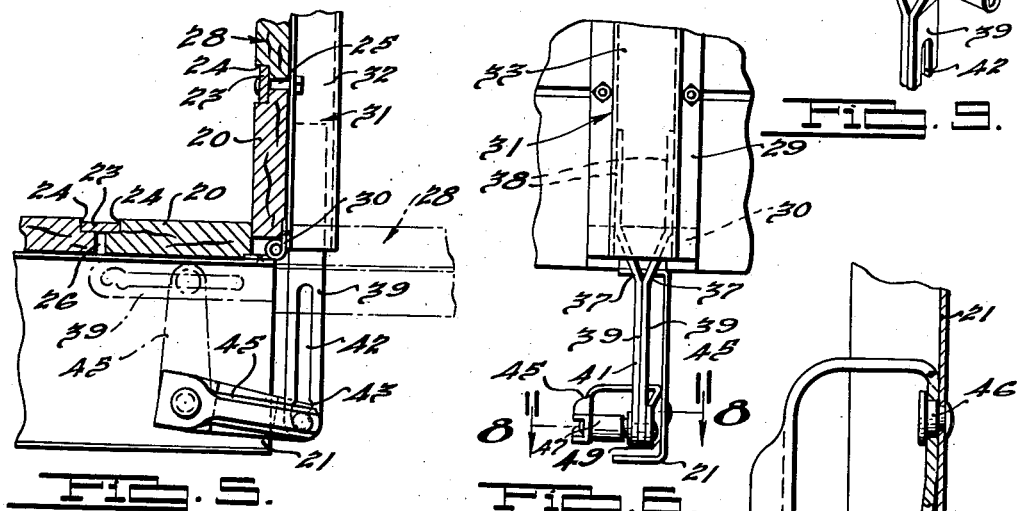
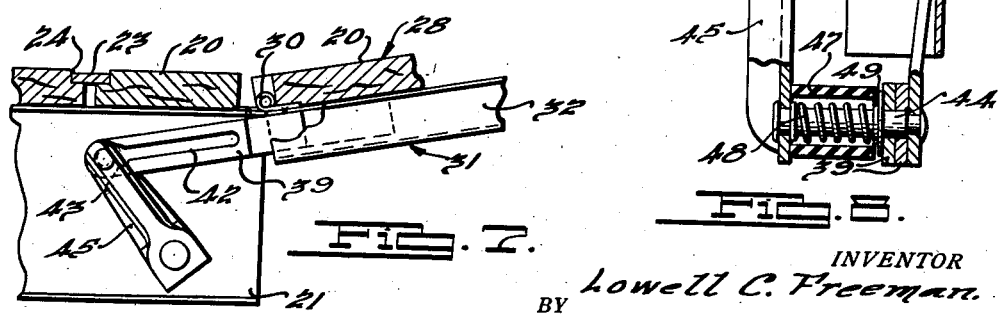
INVENTOR
Lowell C. Freeman.
BY Harness, Dickey & Pierce
ATTORNEYS.

Patented Sept. 29, 1942

2,297,298

UNITED STATES PATENT OFFICE 2,297,298

VEHICLE BODY

Lowell C. Freeman, Detroit, Mich., assignor to The Murray Corporation of America, Detroit, Mich., a corporation of Delaware Application January 12, 1940, Serial No. 313,554

7 Claims. (Cl. 296—14)

My invention relates to vehicle bodies, and particularly to a utility body, the sides of which are adjustable to provide various types of bodies to conform to the load which is to be hauled thereby.

That is to say, my invention pertains to a body having hinged side portions and front and rear end-gate portions having sockets in which racks may be supported to build up the sides to an appreciable height. The sides are so hinged that they may be disposed in extension of the floor of the body, or may be positioned at an angle thereto for hauling hay or like materials. When the racks are removed the sides forming a box body are of sufficient height to carry loose materials, such as grain and like farm produce, since, in a broad application, the body is particularly adapted to farm use. When the racks are supported in extension of the sides, the enclosure thus formed is particularly useful for hauling live stock. Angularly disposed chassis sill elements with laterally disposed cross members form the support for the floor of the body on an axle to which the sills are directly attached. The pneumatic tires on the wheels attached to the axle provide the necessary resiliency for the assembled structure.

For the purpose of illustration, a trailer type of vehicle is illustrated, being particularly adapted for attachment to a tractor to be hauled over the farm property or on the public highway. By properly balancing the load, the trailer may be attached directly to a passenger vehicle or truck, and drawn along the highway in the usual manner. A caster wheel is attached to the front end of the sills forwardly of the body, having adjusting means whereby the wheel may be lowered or raised, to or from the ground, for supporting the front end of the trailer when detached from the tractor.

The hinged sides of the body are provided with extending arms which are slotted to receive a pin disposed on a pivoted arm by which adjustment is made to move the sides from vertical to horizontal position and to slightly angular position, in which position the pin locks the sides in fixed relation to the floor. Additional latching means are provided at the corner of the sides and of the racks to prevent undue strain on the arms and links when the body is loaded.

Accordingly, the main objects of my invention are; to provide a truck type of body having pivoted sides which are movable to and retained in vertical, horizontal, or angular position without employing wrenches or other tools; to provide pivotal sides for a vehicle body, the positions of which are changed by the movement of a pin in the slots of extending arms which are so related as to lock the sides in adjusted positions; to provide a body with hinged sides and removable end-gates which are also hinged; to provide inwardly projecting channel elements for the body sides having projecting arms for controlling the position of the sides, the upper portion of the channels forming sockets for receiving the legs of racks disposed in extension of the sides; to mount a body on angularly disposed chassis sill elements having cross members thereon, with the sills disposed directly on a rear axle and supported at the front end on a caster wheel; and in general, to provide a utility body for a chassis frame, which is simple in construction and adjustment, which has a variety of uses, and which is economical of manufacture.

Other objects and features of novelty of my invention will be either specifically pointed out or will become apparent when referring, for a better understanding of my invention, to the following description taken in conjunction with the accompanying drawings, wherein:

Figure 1 is a side view in elevation of a trailer type of utility truck embodying features of my invention;

Fig. 2 is a plan view of the structure illustrated in Fig. 1, with parts broken away;

Fig. 3 is an enlarged broken sectional view of the structure illustrated in Fig. 2, taken on the line 3—3 thereof;

Fig. 4 is an end view in section of the structure illustrated in Fig. 2, taken on the line 4—4 thereof;

Fig. 5 is a broken sectional view of the structure illustrated in Fig. 1, taken on the line 5—5 thereof;

Fig. 6 is a side view of the structure illustrated in Fig. 5;

Fig. 7 is a view of the structure illustrated in Fig. 5, with the sides hinged at an angle to the floor of the body;

Fig. 8 is an enlarged sectional view of the structure illustrated in Fig. 6, taken on the line 8—8 thereof; and, Fig. 9 is a perspective view of a hinge and lever arm which are welded together.

Referring more particularly to Figs. 1 to 4, I have illustrated a utility type of truck body on a chassis frame 10 of the trailer type, but, as pointed out hereinabove, it is to be understood that the body may be employed directly upon the chassis sills of a self-propelled vehicle. The sills are angularly disposed and of inwardly presented channel section, with the web portion tapering toward each end from a downwardly offset portion 12 to which an axle 13 is attached by gusset plates 14. The sills 11 are joined together at the front end by a stamping 15 having a web 16 to which a ball 17 of a socket connector is secured. The stamping is reinforced by side plates 18 and by an angle element 19 to form a rigid support for the front end of the sill members.

Laterally disposed channel shaped cross members 21 are mounted transversely across the top of the sill elements 11 being rigidly secured thereto by angle elements 22 which are welded to the webs of the sill elements and the cross members. A conventional floor is formed by boards 20 disposed on the cross-members, joined by metal straps 23 disposed in rabbets 24. Bolts 25 extend through the straps 23 and through the slots 26 between the boards 20 and securely anchor the boards to the cross-members and maintain the boards in sealed relation to each other. Additional straps 27 are provided midway between the cross-members 21 to further secure the metal straps 23 within the rabbets 24 of the boards.

At each side of the floor, side panels 28 are provided, being formed of a plurality of boards 20 secured to flanges 29 of inwardly presented channel elements 31 having side flanges 32 and an outer web 33. Metal straps 23 are disposed in rabbets 24 in the spaced edges of the boards through which the bolts 25 extend to secure the boards to the flanges 29. The channel elements 31 form sockets at spaced points along the side panels in which the projecting legs 35 of racks 36 extend to maintain the racks in extended relation to the panels. Hinges 30 are welded or otherwise secured to the top of the cross-members 21 and to the inner faces of the flanges 29 to support the sides in pivotal relation on the cross-members.

A pair of angular straps 37 have the extending arms 38 spaced apart and welded to the sides 32 of the channel elements 31 and to the hinges 30 as illustrated in Fig. 9. Leg portions 39 of the straps extend downwardly therefrom in abutting relation and are welded to each other to form an arm 41 in extension of the channel elements 31 at both ends and in the center of the side panels 28. The arm may be disposed on all of the channel elements but it was found for the particular length of body illustrated that the use of the arm 41 in the manner specified was sufficient to provide the necessary support and means for manipulating the side panels. A slot 42 in the arms 41 has a sinuous end portion 43 which produces the locking of a pin 44 in the slot end. The pin is headed on one end and shouldered on the other and extends through apertures in a stirrup 45 to which the shouldered end is riveted. One arm of the strap is mounted for pivotal movement on a rivet 46 secured to the web of a cross member 21. The opposite arm of the strap has the sides flanged outwardly to provide a handle by which the stirrup may be turned about the rivet 46. A spring 48 urges a washer 49, both of which are mounted on the pin 44, against the side of the arm 41 to provide frictional engagement between the stirrup 45, the arm 41 and the washer.

The side panel 28, as illustrated in Fig. 5, is disposed in vertical position with the pin 44 in the upper portion of the sinuous end 43 of the slot 42 in which position the arms are locked in toggle relation to maintain the side panel in vertical position. The notch of the sinuous slotted end 43 and the frictional relation provided between the arms and washer, prevent the upward movement of the stirrup 45 and the release of the toggle lock formed with the arm 41. When the side panel 28 is to be disposed in horizontal position the stirrups 45 are manually moved upwardly or counter-clockwise to break the toggle relation to permit the side panels 28 to be swung outwardly into horizontal position. In this position the stirrups 45 are disposed vertically as illustrated in dot and dash lines in the figure.

When it is desired to have the sides disposed at an angle, when hauling hay, fodder, and the like, the stirrups 45 are moved a further amount in a counter-clockwise direction to have the pin 44 engage the lower notch in the sinuous end portion 43 of the slot 42 and thereby again form a toggle lock with the arm 41 to retain the side panel 28 in the angular position illustrated.

End panels 51 are constructed in a similar manner to the side panels 28. The end cross members 21 have oppositely disposed angle elements 52 welded or otherwise secured thereto to provide a slot 53 in which the end of the arm 41 on the spaced channel elements 31 are secured by a pair of removable pins 54. The end panels are held in rigid position by the pins and through the removal of the top pin the panel may be swung outwardly and may be detached when both pins are removed. Suitable latching means 55 are provided at the corners of the side and end panels 28 and 51 respectively, and at the corners of the racks 36 to retain the corners in fixed relation to each other.

Rearwardly of the front end of the sills 11 plates 56 and 57 are secured for supporting a threaded nut 58 through which a threaded shaft 59 of a caster wheel 61 extends. An operating arm 62 is attached to the upper end of the shaft 59 by which the shaft may be turned to raise or lower the caster wheel from the ground. After the front end of the trailer is secured to the hitch of the tractor, the operator manipulates the arm 62 to raise the wheel 61 from the ground so that the front end of the trailer is entirely supported on the hitch of the tractor. Similarly, when a separation of the trailer is to be made from the tractor, the shaft 59 is screwed downwardly to have the wheel 61 engage the ground to take the load from the tractor hitch which is then separated from the trailer.

It will thus be seen that I have provided a body which, as herein illustrated, may be used as a utility vehicle to be employed in conjunction with a tractor. The body may be disposed directly upon the chassis frame of a truck when it is desired to have the utility body self-propelled. The body may have the sides lowered to horizontal extension of the floor, or may be disposed at a slight angle thereto. The sides may be moved to vertical position and retained in this or any of the mentioned positions by a novel locking device. The shifting and locking of the sides occurs through the movement of arms over toggle position and requires no wrenches or other tools to effect such changes. The corner of the panels are locked together to provide additional assurance against separation when loaded and the panels are so formed as to provide pockets for receiving the stakes from the racks to form an extended body.

While I have described and illustrated but a single embodiment of my invention, it will be apparent to those skilled in the art that various changes, omissions, additions, and substitutions may be made therein without departing from the spirit and scope of my invention, as set forth in the accompanying claims.

I claim as my invention:

1. A truck type of body having a floor and hinged side panels in combination with slotted arms rigidly secured thereto and projecting below said floor, pivoted arms joined to said extending arms and forming an over-center toggle therewith when the sides are disposed in vertical position.

2. The combination in a truck body having a floor, panels pivoted at the sides thereof, rigid arms on the side panels projecting below the floor, said rigid arms being provided with a slot, additional arms pivoted to said body below said floor, a pin on said pivoted arms projecting through the slot of said rigid arms, the length of said arms being such that the sides are locked in vertical position when the pivoted arm has moved in over-toggle relation to said rigid arm.

3. The combination in a truck body having a floor, panels pivoted at the sides thereof, rigid arms on the side panels projecting below the floor, said rigid arms being provided with a slot, additional arms pivoted to said body below said floor, a pin on said pivoted arms projecting through the slot of said rigid arms, the length of said arms being such that the sides are locked in vertical position when the pivoted arm has moved in over-toggle relation to said rigid arm, and means retaining said arms in frictional relation to each other.

4. The combination in a vehicle body, of a longitudinally extending sill, cross-members on said sill, a floor secured to said cross-members, side panels for said body, hinge means connecting the side panels to said cross-members, arms on said side panels projecting below said floor, said arms being provided with a slot, pivoted arms on said cross-members, pins on said arms projecting through the slot on said projecting arms, said pivoted arms being movable in over-toggle relation to said projecting arms when the sides are moved to vertical position.

5. The combination in a vehicle body, of a longitudinally extending sill, cross-members on said sill, a floor secured to said cross-members, side panels for said body, hinge means connecting the side panels to said cross-members, arms on said side panels projecting below said floor, said arms being provided with a slot, pivoted arms on said cross-members, pins on said arms projecting through the slot on said projecting arms, said pivoted arms being movable in over-toggle relation to said projecting arms when the sides are moved to vertical position, and said pivoted arms also being moved in over-toggle relation to said projecting arms when maintaining the panel at an angle to the body floor.

6. The combination in a vehicle body, of a longitudinally extending sill, cross-members supported thereon, a floor secured to said cross-members, side panels having inwardly presented channel elements, an arm projecting downwardly below the floor from the end of certain of said channel elements, said downwardly projecting arms being provided with a slot, a pivoted arm on said cross-members, pins connecting the arms to the slot of said projecting arms, said arms being disposed in over-toggle relation when the side panels are in a vertical and in an angular position to the floor.

7. In a vehicle body having a floor and side panels, inwardly presented channel elements hinged to said floor and secured to said panels, an arm projecting from the channel elements having a slot, an arm pivoted to the body having a pin projecting through said slot, a washer on said pin, a spring over said pin, and a cup secured to the end of the pin projecting over said spring to form a handle for operating the pivoted arm to move the arm to and from toggle relation to said slotted arm where it is maintained against movement by the friction between the arms provided by said spring.

LOWELL C. FREEMAN.